Dec. 8, 1970          A. JAMIESON          3,545,099
                      DISPLAY UNIT

Filed Feb. 26, 1968                    2 Sheets-Sheet 1

INVENTOR
Alan JAMIESON

ATTORNEY

INVENTOR
Alan JAMIESON
ATTORNEY

United States Patent Office 3,545,099
Patented Dec. 8, 1970

3,545,099
DISPLAY UNIT
Alan Jamieson, 4845 Orchard St.,
St. Hubert 1, Quebec, Canada
Filed Feb. 26, 1968, Ser. No. 708,239
Int. Cl. G09b 5/02
U.S. Cl. 35—6                                    7 Claims

ABSTRACT OF THE DISCLOSURE

An apparatus to be used as an aid in learning to read punched paper tape. The apparatus has a series of buttons arranged in a row equal in number to the number of possible hole positions in a single row of tape. The apparatus also has a display screen capable of displaying all the items of information which can be coded into the tape. The apparatus is electrically wired in such a manner that when the buttons are operated in a pattern corresponding to the pattern of holes in the row of tape being read, the item of information represented by the hole pattern will be displayed on the screen.

---

This invention relates to an apparatus to be used as an aid in reading punched paper tape.

Punched paper tape is widely used in industry to transmit information. The tape in many instances can be used to control the operation of machines. In the printing industry, the punched paper tape provides coded information for setting type. A skilled person can read the tape and, from memory, know the item of information represented by each hole pattern in the tape. For a person learning to set type from information encoded in punched paper tape, it has been common practice, until the individual becomes familiar with and has memorized what each pattern of holes in a single row represents as an item of information, to decode the hole pattern by looking up, on a printed sheet, what each hole pattern represents. This procedure is time-consuming, since the printed sheet must be scanned to find the same pattern of holes as appears on the row of tape being read. The procedure can also be tedious if the sheet containing the decoding information is in close-spaced print, and care must be taken to read the correct item of information corresponding to the hole pattern read. The above disadvantages also tend to increase the time it takes for a person to become familiar enough with the various combinations of hole patterns to be able to dispense with looking up each hole pattern from printed information to decode it.

In order to assist a person to learn to read punched paper tape quickly and easily, it is the purpose of the present invention to provide an apparatus which can be manually operated to provide a visual indication of what any pattern or combination of holes in a row of punched paper tape represents.

The apparatus provides a much more rapid way of training a person to read paper tape than having him look up the printed translation each time a row of holes is read. In addition, having the person manually operate an apparatus to provide an indication of what each row of holes represents speeds up the learning process and thus shortens the time it takes for the person to commit the code used in representing information by punched paper tape to memory.

It is, therefore, an object of this invention to provide an apparatus to be used as an aid for a person learning to read punched paper tape.

More particularly, it is an object of the invention to provide an apparatus which can be manually operated in a manner corresponding to the arrangement of the holes in a row of punched paper tape to instantly give a pictorial representation of what the particular arrangment of holes in the row represents.

It is another object to provide a method for rapidly teaching a person to read punched paper tape.

The invention will now be described in detail having reference to the drawings wherein.

Figure 1:
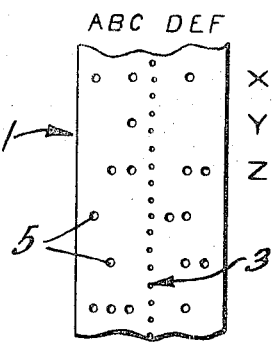
FIG. 1 illustrates a strip of punched paper tape.

The punched paper tape 1 shown in FIG. 1 has a central row of perforations 3 for guiding the paper tape through a machine which punches the holes in it. As shown in the figure, the holes 5 in each row X, Y, Z can be punched in any one of six positions, A, B, C, D, E, and F. Each row of holes in the paper tape is punched in a specific pattern representing an item of information such as an instruction, a letter of the alphabet, or a number. While a six-level punched paper tape has been shown, it will be obvious that tapes having a different number of hole positions may also be read in a manner to be described.

Figure 2:
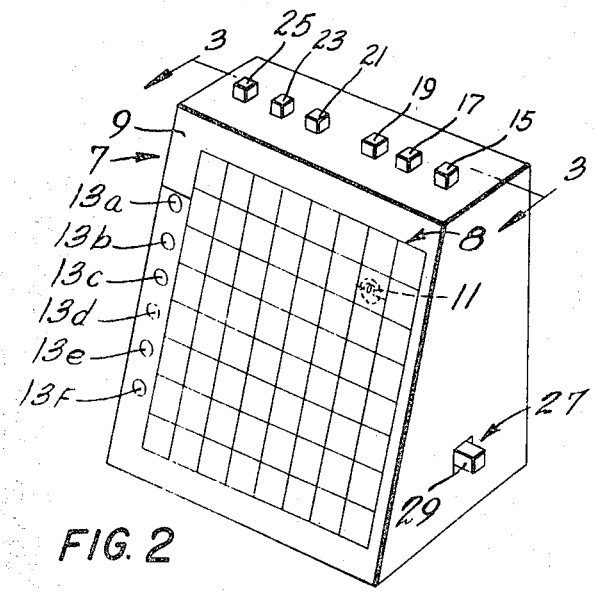
FIG. 2 is a schematic view of the apparatus used as an aid in reading punched paper tape.

The apparatus for aiding in reading punched paper tape is shown in FIG. 2 and comprises a box-like structure 7 having a screen 8 on its front face 9. Preferably, the screen is made of translucent material divided into a plurality of squares equal in number to all the possible combinations of hole arrangements in one row of tape. Thus, for example, for six-level paper tapes, sixty-four squares would be provided. Each square has an indice pictorially showing the item of information encoded in a particular arrangement of holes etched or painted on the translucent material. A lamp 11 is located behind each square. Each lamp, when switched on, illuminates that indice in the square located in front on the lamp.

In addition, there is located on the front face of the apparatus, adjacent the indice squares, a row of lamps 13A to 13F equal in number to the number of hole positions in a row of the tape, six in the example being described. These lamps are illuminated in a pattern corresponding to the pattern of holes in the row of the tape being read upon operation of the machine so as to aid the reader in correlating the pattern indicated by the row of lamps with the item of information illuminated in one of the squares on the front face. The row of lamps increases the reader's speed in learning what item of information each pattern of holes represents.

Figure 3:
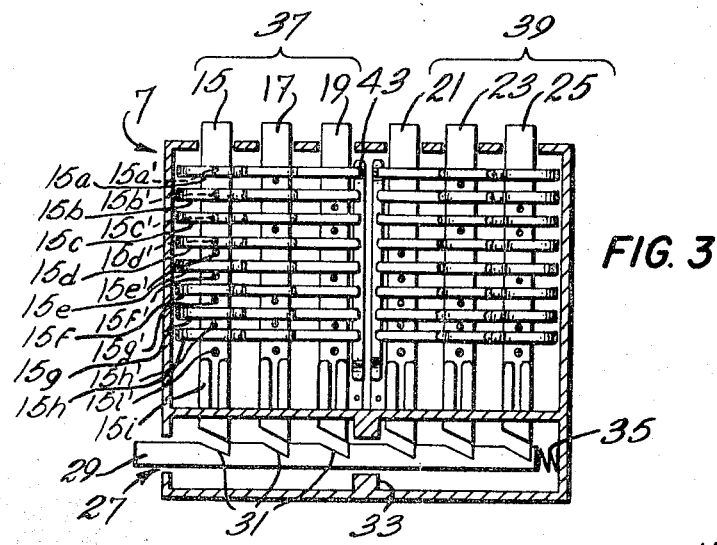
FIG. 3 is a rear cross-sectional view of the apparatus taken along line 3—3 in FIG. 2.

To illuminate any one square on the front face of the apparatus, a row of switch-actuating members in the form of push buttons is located on the top of the apparatus. The number of these switch-actuating members corresponds to the number of hole positions in the paper tape. The embodiment shown has six switch-actuating members 15, 17, 19, 21, 23 and 25. Actuation of the members in a pattern corresponding to the pattern of holes in the row of tape being read switches on the lamp illuminating the item of information represented by the pattern of holes. Each member is arranged for vertical movement in the apparatus, and controls a series of switches which are opened or closed in a predetermined pattern when each member is depressed. For reading six-level paper tape having six possible hole positions in each row, each member, such as member 15 for example, controls eight switches 15A to 15H. In addition, each member closes an additional switch upon depression of the member such as switch 15J. Each of the switches can be in the well-known form of normally closed spring switches which, when an actuating lobe on the member is moved beneath the switch, raises it to open the switch. For example, member 15 has nine lobes 15A' to 15J', one cooperating with each switch 15A to 15J. Reset means 27 to return the actuating members 15 to 25 to their raised position after being depressed in preparation for reading the next row of holes in the paper tape consist of a cam member 29 having cam surfaces 31 equal in number to the number of switch-actuating members. When the cam member is moved horizontally, to the left as shown in FIG. 3, through suitable guide means 33, the cam surfaces 31 push the depressed switch-actuating members to their upper position, and the cam member is then returned by spring means 35. The apparatus is now ready to aid in reading the next row of holes in the paper tape. Other means for resetting the switch-actuating elements can be provided.

Figure 4:
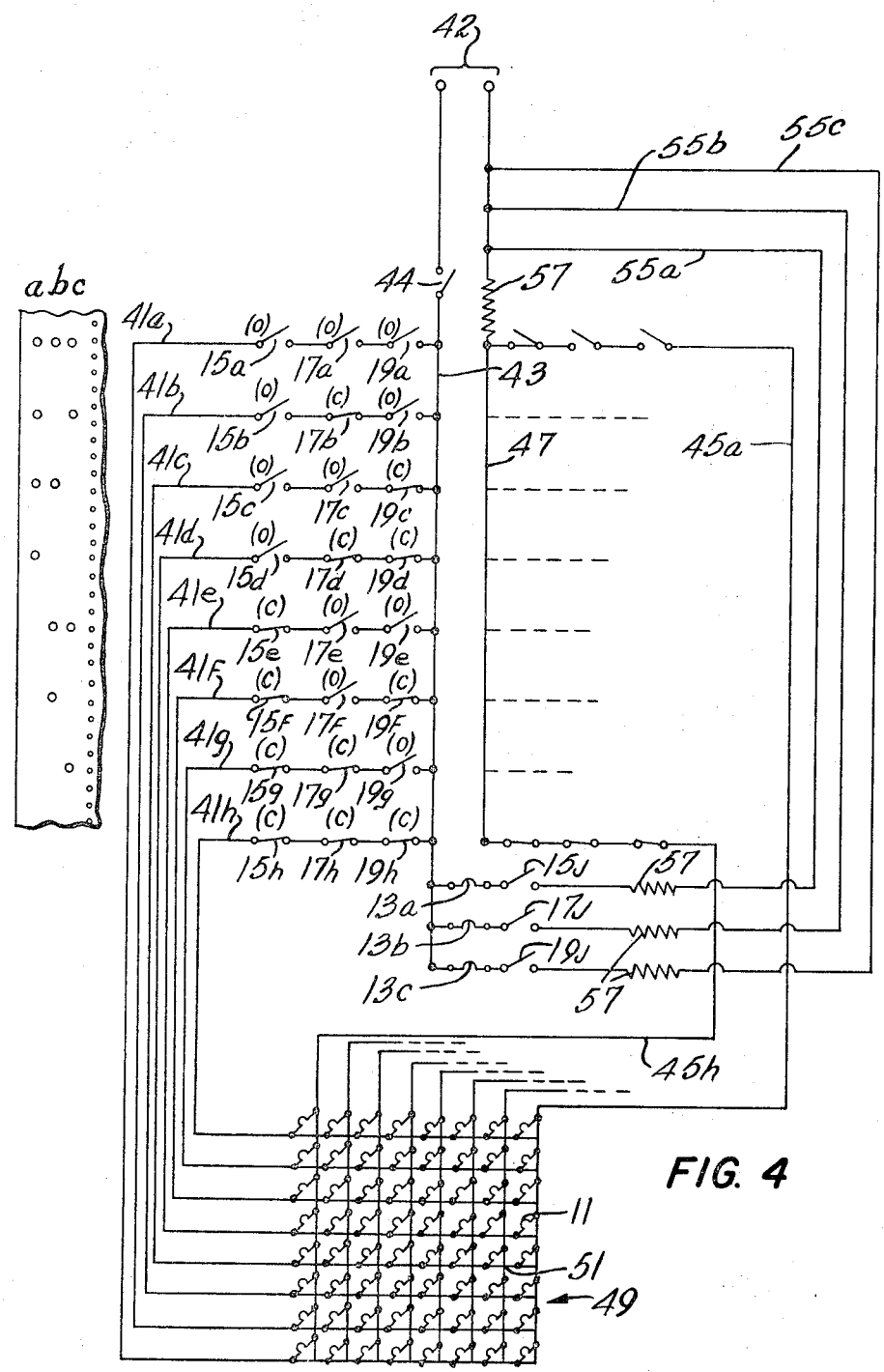
FIG. 4 is a circuit diagram of the apparatus.

As shown in FIG. 3, the six switch-actuating members are divided into two groups 37 and 39, of three members each, group 37 corresponding to hole positions A, B and C, and group 39 corresponding to hole positions D, E and F in the paper tape. Since each group of members functions in a similar manner, only one group will be described in detail. The group 37 of three switch-actuating members 15, 17 and 19 can be actuated a total of eight possible ways corresponding to the eight possible combinations of holes in positions A, B and C of the tape. As shown in FIG. 4, eight conductors 41A to 41H are provided, one for each possible combination of ways in which the members can be actuated. Each conductor 41A to 41H is connected to a bus bar 43 to supply current from a current source 42 to the conductors. A switch 44 may control the current source 42. Each conductor has three switches such as 15A, 17A and 19A, one for each member 15, 17 and 19, arranged in series. The three switches in each conductor line are arranged to be opened or closed upon movement of the three actuating members in various combinations so that only one of the conductor lines is closed for each combination.

FIG. 4 illustrates schematically how the series of switches associated with each conductor and actuated by members 15, 17 and 19 can be arranged so that each conductor represents one particular combination of holes. To the left of the drawing, all the possible combinations of holes obtainable in the three positions A, B and C of the tape are shown, one combination for each conductor. The switches operated by each member 15, 17 and 19 are shown to be either closed (C) or opened (O) when the members are not depressed. The switch positions are reversed when the members are depressed. Thus, switches 15A to 15D are open and 15E to 15H are closed when member 15 is not depressed. Depression of member 15 closes switches 15A to 15D and opens switches 15E to 15H. The open and closed positions of the switches 17A to 17H and 19A to 19H are also shown with the members not depressed and are reversed when depressed.

In operation, and considering only the left-hand portion of the tape containing columns A, B, C, if the person reading the tape sees holes in columns A and C, he depresses members 15 and 19. Since member 17 is not depressed, switch 17B in conductor 41B remains closed. Switch 17A in conductor 41A remains open. Similarly, switches 17C, 17E and 17F in conductors 41C, 41E and 41F respectively remain open. Switches 19D and 19H in conductors 41D and 41H are opened upon depression of member 19 and switch 19B in conductor 41B is closed. Switch 15B is closed and switch 15G is opened in conductors 41B and 41G respectively. Every conductor therefore has at least one open switch except conductor 41B which has all three switches 15B, 17B and 19B closed and therefore conducts current from the bus bar. Conductor 41B thus represents the left-hand portion of the tape having holes punched in positions A and C. A similar arrangement is used to read the right-hand portion of the tape containing positions D, E and F using group 39 of members 21, 23 and 25.

Each conductor 41A to 41H is connected to the display means and arranged horizontally. Similar conductors 45A to 45H leading from a second bus bar 47 and controlled by switches associated with actuating members 21, 23 and 25 in a manner similar to the switches of members 15, 17 and 19 are connected to the display means vertically. The horizontal and vertical conductors form a grid 49 having crossing points 51. At each crossing point a neon lamp 11 is connected to both the horizontal and vertical conductors forming the crossing point. Each lamp is located directly behind a square on the translucent screen each square of which carries an indice representation. For any one of the neon lamps 11 current passing through both the vertical and horizontal conductors at the crossing point where the lamp is located will cause it, and none of the other lamps connected to the live vertical and horizontal conductors, to light. The light illuminates the pictorial representation of the particular item of information on the screen which has been coded into the tape in the row being read and transferred to the apparatus by depressing the actuating members in a pattern corresponding to those positions in which the holes have been punched.

The depression of each actuating member 15, 17, etc. closes a corresponding switch 15J, 17J, etc. in a series of conductors 55A, 55B, etc. connected between bus bars 43, 47 each connected to one of the lamps 13A to 13F arranged in a row on the face of the apparatus. Three of the lamps 13A, 13B and 13C, and their circuits, are shown in FIG. 4. Resistances 57 control the operating voltage for the lamps 13A, 13B and 13C. These lamps light in a pattern corresponding to the pattern of holes punched in the row read. The illuminated pattern, being adjacent to the illuminated pictorial representation of the item of information, helps the reader correlate the particular hole pattern with the coded information it contains to speed up the learing process.

The neon lamps used at each intersection are standard purchased items such as, for example, Type N.E. 2 Pilot lamps sold by General Electric or Westinghouse. In order to keep the circuit of the apparatus simple, neon lamps aer preferably used since their characteristic is such that only that lamp at a particular crossing point which has two live conductors will light and none of the other neon lamps connected to either the live horizontal or vertical conductor will light. A resistance 57 to drop the operating voltage of the neon lamps is inserted in the circuit, which practice is well known. For operation of the apparatus on 110 A.C., .22 megohm, half-watt resistors are used as resistances 57.

Other variations and modifications of the apparatus will be apparent to people skilled in the art. For example, paper tape is now being used in the printing industry which for six-column tape can encode twice the information by changing the code designation prior to each row. The change code prior to each row indicates whether the row to be read should be decoded under group A or group B, both groups representing entirely different items of information. Thus, a single hole punched in the tape in the second column B could represent the letter L or the number 2 depending on change code previously read. This type of tape could be read on the machine by dividing each square in the display means into two different coloured areas with one colour for each code group. Reading the first change code would set the apparatus to the proper colour for the code group being read and then reading the following row would illuminate the item of information coded in the proper colour for the proper code group.

I claim:

1. An apparatus to be used as an aid in learing to read paper tape having information encoded therein in the form of rows of hole patterns punched in the tape, there being N possible positions for punching holes in each row, including: a housing, display means on the housing for pictorially displaying each of the total number of items of information which can be encoded in the N positions in a row, N manually actuated members on the housing arranged in a row, the N actuating members divided into two adjacent groups representing two adjacent groups of hole positions in the paper tape, means controlled by the two groups of N actuating members for pictorially displaying on the display means a single item of information represented by a particular pattern of holes punched in a single row of tape upon manually actuating the members in a pattern corresponding to the pattern of the holes, the means including a current source, lamps for illuminating each item of information on the display means, an electrical circuit associated with each group of members connecting the current source to the lamps, each circuit including a plurality of conductors, one for each of the number of possible combinations in which the actuating membesr of that group can be operated, and each conductor in a circuit having switch means operable by the actuating members associated with that circuit in a manner to have only one conductor conduct current for each possible combination in which the members can be actuated.

2. An apparatus as claimed in claim 1 wherein the conductors from one circuit means form horizontal rows and the conductors from the other circuit form vertical columns, the horizontal rows and vertcial columns forming a grid having crossing points equal in number to the total number of items of information which can be encoded in the paper tape.

3. An apparatus as claimed in claim 2 wherein the display means includes a translucent screen covering the grid formed by the conductors, a pictorial representation of each item of information on the screen, each pictorial repersentation adjacent a crossing point of the grid, one lamp connected to the grid at each crossing point, the lamp at any one crossing point illuminating a pictorial representation of an item of information on the screen when both the vertical and horizontal conductors at that crossing point conduct current.

4. An apparatus as claimed in claim 3 wherein each lamp is a neon lamp.

5. An apparatus as claimed in claim 1 including a separate row of N lamps on the housing and means for illuminating the lamps in a pattern corresponding to the pattern in which the actuating members are manually operated.

6. An apparatus to be used as an aid in learning to read paper tape having information encoded therein in the form of rows of hole patterns punched in the tape, there being N possible positions for punching holes in each row, comprising: a housing, a translucent screen on the housing pictorially displayng each of the total number of tems of information which can be encoded in the paper tape, N manually actuated members arranged in a row on the housing, said members divided into two adjacent groups, a current source, conductors associated with each group of members for connecting the current source to means for illuminating the screen and equal in number to the number of possible ways in which the actuating members in each group can be operated, switch means in each conductor, one for each of the actuating members in the group, each switch controlled by its actuating member upon operation of the actuating members in any one particular pattern corresponding to the pattern of holes punched in the row of the paper tape being read to illuminate the item of information on the screen encoded by the hole pattern.

7. A method for teaching a person to read punched paper tape including the step of manually operating a row of members equal in number to the number of position holes which can be punched in a row in the paper tape in a pattern corresponding to the pattern of holes in the row of tape being read so as to provide a pictorial representation on a screen of the item of information encoded in the pattern of holes and simultaneously correlating the pictorial representation of the item of information with a row of lamps adjacent the pictorial representation and equal in number to the number of manually operable elements, which row of lamps has been illuminated in a pattern corresponding to the pattern of holes in the row of paper tape.

References Cited
UNITED STATES PATENTS 450,615   4/1891   Delany _____ 40—52

FOREIGN PATENTS 616,055   1/1949   Great Britain _____ 35—35

EUGENE R. CAPOZIO, Primary Examiner

J. H. WOLFF, Assistant Examiner